Feb. 22, 1955 V. R. PRONIO 2,702,772
METHOD OF PRODUCING A ROLL OF PRESSURE-SENSITIVE TAPE
Filed Dec. 20, 1951
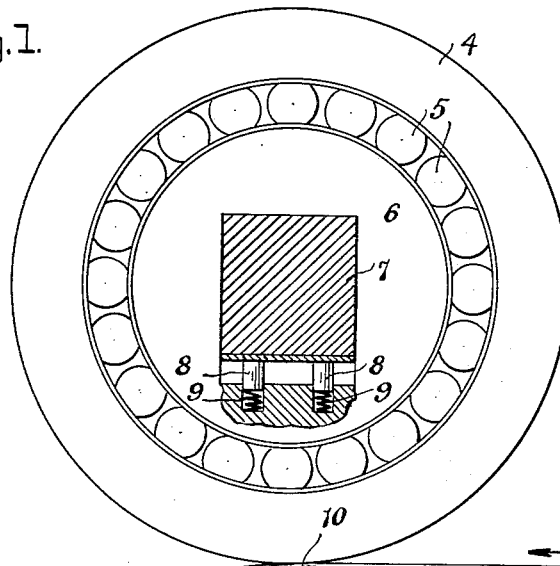
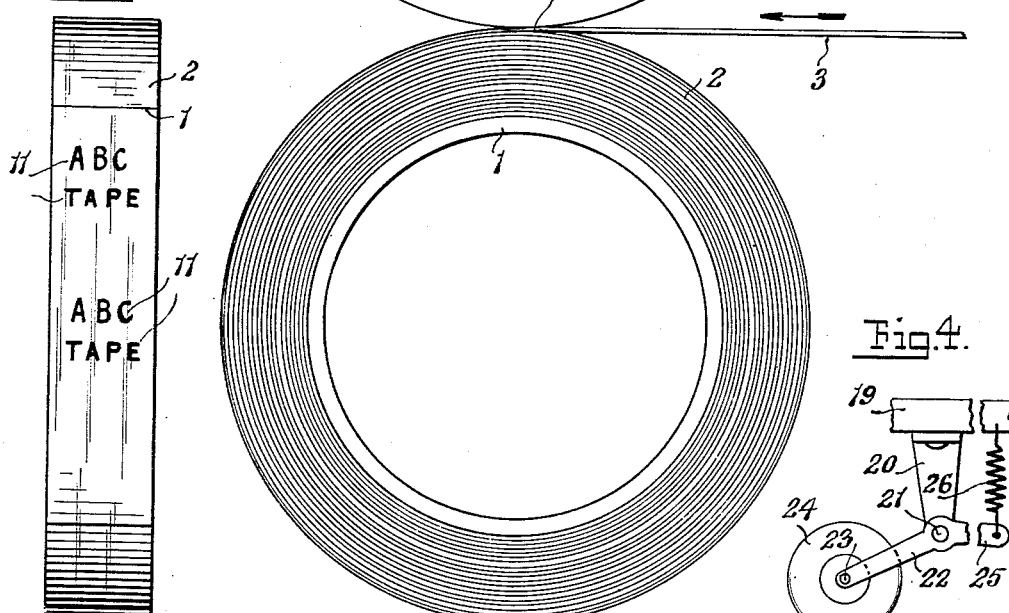
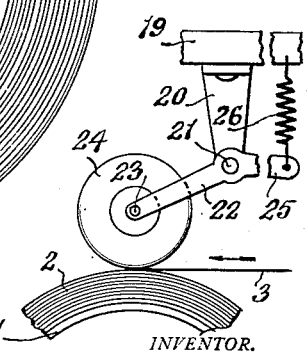
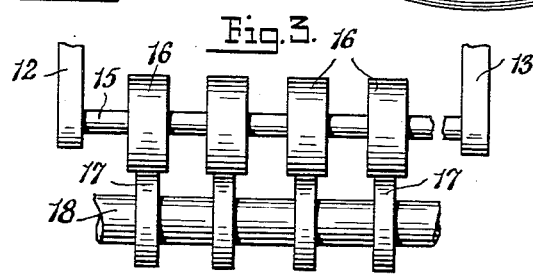
INVENTOR.
Vincent R. Pronio
BY Harry Radzinsky
ATTORNEY

United States Patent Office 2,702,772
Patented Feb. 22, 1955

2,702,772

METHOD OF PRODUCING A ROLL OF PRESSURE-SENSITIVE TAPE

Vincent R. Pronio, New Brunswick, N. J.

Application December 20, 1951, Serial No. 262,620

6 Claims. (Cl. 154—117)

This invention relates to a method and means for winding pressure-sensitive tape into roll form, and particularly tape of the transparent character. An example of such tape is that which is composed of cellophane and provided on one face with adhesive material by which it is caused to adhere to a surface.

Rolls of this type of tape usually consist of a hollow or cylindrical cardboard core on which the tape is wound. After the tape is stored in such roll form for a relatively short time, it usually exhibits a tendency to become translucent or even opaque so that its usefulness as a wholly transparent strip or mending tissue is thus impaired. I have found that this tendency of the tape to become "cloudy" or translucent is due to the fact that air enters between the convolutions of the roll and reaches the adhesive surface of the tape and thus dries or clouds the adhesive, and this despite the fact that the convolutions of tape forming the roll appear to be tightly wound one upon the other with the adhesive face of each convolution of the tape in apparent close contact with the back of the preceding convolution.

Due to the fact that there is not real intimate contact between the several convolutions in the roll and air may thus enter between the same to reach the adhesive surface of the tape, the adhesive material on the tape dries out in spots so that when the tape is pressed against a surface, and to which it is intended to make an all-over intimate and adherent contact, it will fail to make such contact and will thus adhere in some areas and remain unattached in others.

With a knowledge of these deficiencies found in tape as marketed at the present time, it is an object of the present invention to provide a method and means for winding tape into roll form and in which the various convolutions of the rolled tape will be caused to lie in very intimate contact and to such an extent as to prevent the entry of air between the layers of the tape in the roll. The result of this is that a roll is provided in which the tape is completely transparent; in which advertising matter appearing on the core of the roll and beneath many layers or convolutions wound on the core is visible and easily readable. In addition, the tape, when pulled from the roll and torn off in the length desired will be found to not only be clear and transparent, but the adhesive material on one face of the same will be evenly and uniformly spread over the face of the tape thus insuring an over-all and uniform adherence to any surface against which the tape may be applied.

With these objects and such other objects as may hereinafter appear, in view, I have devised the particular steps and arrangement of parts to be described in detail in the following specification and set forth in the claims appended hereto.

In the accompanying drawing, wherein an illustrative embodiment of the invention is disclosed, Fig. 1 is a side elevation of a roll of tape being produced according to the invention, and showing the means for applying pressure to the tape as it is being wound upon the core of the roll;

Fig. 2 is a front elevation of the wound roll;

Fig. 3 is a view showing a gang of pressure rollers operating to wind a plurality of rolls of tape; and Fig. 4 shows a modified means for resiliently mounting a pressure roller.

The roll of tape which is wound according to the present invention, includes a hollow, cylindrical tube or core 1, preferably, but not necessarily composed of cardboard. The tape wound on the core in a plurality of layers or convolutions 2 is of the transparent, clear or colored type, such as cellophane, and is provided on its under face 3 with the conventional adhesive coating of the pressure-sensitive variety. Such tape is thus caused to adhere to a surface by merely pressing the adhesive face 3 of the same to contact with such surface.

In the conventional manufacture of the tape, the same proceeds from the coating machinery to a point where it is wound up on the rotated cardboard core 1 until a predetermined amount of the tape has been wound on each core. In carrying out the present invention, I apply pressure to the tape as it is wound on the roll, such as at the point indicated at 10, with such pressure being sufficiently great to cause a very intimate contact of the adhesive or sticky face of the tape with the back of each preceding convolution. As a result of thus firmly pressing the adhesive face of each portion of the tape against the portion of the tape that precedes it, air is prevented from entering between the convolutions or layers of the roll and thus the adhesive material, located between the convolutions, will always remain very tacky and in its natural transparent condition and uniformly and evenly coating one face of the tape. Thus, when such a tape is withdrawn from the roll it will be found to be not only exceptionally adherent but extraordinarily transparent and when used for mending or repairing printed or written pages, the printed or written matter covered by the type will be found to be most plainly visible, and the tape almost invisible, due to its transparency. Moreover, when the tape is in roll form as shown in Fig. 2, its transparency is such that printed or advertising matter 11 provided on the outside face of the core, will be very plainly readable through the tape despite the fact that many layers or convolutions of the tape are wound on the core.

In carrying out the invention, the required pressing or ironing pressure imposed on the tape may be applied in various ways, one of which is shown in the drawing. Referring to Fig. 1, it will be noted that a pressure roller is therein shown in which is provided an outer freely rotative part or rim 4 having its periphery held in firm but resilient contact with the tape and particularly at the point 10 where the tape is being wound on the roll. The inside or non-rotative section of the roller is shown at 6, and roller bearings 5 are disposed between the part 6 and the outer part or rim 4 to insure free rotative movement of the rim 4. The inside part 6 of the roller is vertically movable on a stationary square shaft, or a squared part 7 on a round stationary, non-rotative shaft, suitably supported above the roll of tape. Extending downwardly from the squared element 7 is a pair of pins 8 which extend in recesses formed in the part 6 and in each of which is located a compression spring 9.

This arrangement is such that the springs 9 will firmly but resiliently hold the roller with its rim portion 4 in contact with the tape to apply the required pressure on the same at the point 10 and insure intimate contact of the sticky face of the tape with the portion of the tape that is already wound in the roll. As the roll increases in diameter, the springs 9 will permit required raising movement of the roller without materially diminishing the pressure of the same on the tape.

While I have shown in Fig. 1 a single roller applying pressure on the tape being wound into a single roll, it will be apparent that a gang of pressure rollers may readily apply pressure on an equal number of tape rolls. This is noted in Fig. 3, wherein brackets 12 and 13 are shown supporting the opposite ends of a shaft 15 on which a plurality of pressure rollers 16, constructed substantially as shown in Fig. 1, are rotatively mounted. The tape rolls 17 are wound below the several pressure rollers 16 as explained in connection with Fig. 1, said tape rolls being mounted on the rotative shaft 18.

Pressure for the roller which is operative against the tape may be applied in other ways, a modification thereof being shown in Fig. 4, wherein a suitably supported bracket 19 carries a dependent lug 20 on which a two-armed lever is pivoted on the pivot pin 21. The arm 22 of said lever carries a freely rotatable roller 24, rotatively mounted on the axle 23. The second arm 25 of the lever is connected to one end of a spring 26 which has its opposite end connected to the bracket 19. Said spring acts to hold the periphery of the roller 24 in firm but resilient contact with the tape as the same is being wound upon the core 1, the latter being held upon a suitable rotating shaft, such as that shown at 18 in Fig. 3.

As the tape is wound upon its core, the pressure imposed upon the tape will cause intimate contact between the convolutions sufficient to prevent the entry of air between the same. Since this will prevent drying out and resultant discoloration of the adhesive, the tape will remain perfectly transparent in the roll despite long periods of storage. Since the tape is thus truly transparent its usefulness may be extended to the performance of functions not possible by a cloudy, discolored tape. In addition, the transparency of the tape permits advertising printed on the outside face of the core to be plainly visible through it, thus increasing the advertising value of the core. Furthermore, since the adhesive on the tape is maintained fresh and free from discoloration and uniformly sticky for the entire area of the tape, more uniform adherence of the tape to any surface than is attained by conventionally-wound tapes is assured.

I am aware that prior to the present invention, idle rollers have been employed for contact with non-adhesive paper wound on rolls, but such rollers have been solely employed for taking up slack in the paper web being fed, and the same have no pressing or ironing function and have never, to my knowledge, been employed for pressing an adhesive coated tape into contact with preceding layers in a roll for the purposes mentioned and advantages secured as herein pointed out.

While I have herein described the means for applying the pressure to the tape as it is being wound, as being one or more rollers in contact with the tape, it will be apparent that other pressure-applying means may be employed. Also, while I have herein described the pressure as being applied at a single point, it will be apparent that rollers arranged in tandem might also be used so that the pressure might be applied at several points on the roll, the optimum sought being a wound roll of tape in which the adhesive face of the same is firmly in contact with the under layers to the extent of excluding air from between the convolutions, preventing drying of the adhesive and resultant discoloration or clouding, and providing a clear, transparent tape having a sticky face of uniform tenacity from edge to edge.

Having described an embodiment of the invention, it is obvious that the same is not to be restricted thereto, but is broad enough to cover all structures coming within the scope of the annexed claims.

What I claim is:
1. The method of winding pressure-sensitive tape comprising, winding the tape upon a core and applying sufficient pressure to the tape as it is wound on said core to thereby cause intimate adhesive adherence between the convolutions of the tape and prevent the entry of air between said convolutions.

2. The method of winding pressure-sensitive tape on a core comprising rotating the core to wind the tape thereon, and applying sufficient pressure on the tape as it is wound on the core to thereby intimately adhesively unite the convolutions of the tape and prevent the entry of air therebetween.

3. The method of winding transparent, pressure-sensitive tape on a core comprising rotating the core to wind the tape upon it, and applying the pressure of a roller on tape as it is wound on the core, with said pressure sufficient to intimately and adhesively unite the convolutions of the tape wound on the core and prevent the entry of air between said convolutions.

4. The method of winding transparent, pressure-sensitive tape comprising, the step of winding the tape on a core, applying pressure to the tape by pressure means to thereby compress it between said pressure means and the core and intimately and adhesively unite the convolutions of the wound tape and prevent the entry of air therebetween.

5. The method of producing a roll of pressure-sensitive tape comprising, rotating a core, feeding tape to the same to cause the tape to be wound upon the core, and applying the pressure of a spring-pressed roller to the tape as it is wound on the core to thereby firmly press the tape on the preceding convolutions and cause the convolutions to be adhesively united to an extent sufficient to prevent the entry of air between said convolutions.

6. The method of winding transparent cellophane pressure-sensitive tape comprising, winding the tape on a roll while the tape is under sufficient pressure to thereby intimately adhesively unite the convolutions of the roll and prevent the entry of air between said convolutions.

References Cited in the file of this patent

UNITED STATES PATENTS

| Number | Name | Date |
|---|---|---|
| 44,254 | Forsyth | Sept. 13, 1864 |
| 565,116 | Meyer | Aug. 4, 1896 |
| 1,844,647 | Everett | Feb. 9, 1932 |
| 2,248,318 | Van Cleef | July 8, 1941 |
| 2,332,371 | Corbin et al. | Oct. 19, 1943 |
| 2,334,585 | Schieman | Nov. 16, 1943 |
| 2,350,369 | Sampair et al. | June 6, 1944 |
| 2,426,257 | Ziegler | Aug. 26, 1947 |
| 2,528,713 | Thomson | Nov. 7, 1950 |
| 2,548,980 | Kellgren | Apr. 17, 1951 |
| 2,569,797 | Campbell | Oct. 2, 1951 |